(12) United States Patent
McDonald (10) Patent No.: US 8,384,978 B2
(45) Date of Patent: Feb. 26, 2013

(54) OPTICAL CLOCK

(75) Inventor: Gregor John McDonald, Upton Upon Severn (GB)

(73) Assignee: Qinetiq Limited, London (GB)

( * ) Notice: Subject to any disclaimer, the term of this patent is extended or adjusted under 35 U.S.C. 154(b) by 521 days.

(21) Appl. No.: 12/440,472

(22) PCT Filed: Sep. 10, 2007

(86) PCT No.: PCT/GB2007/003372
§ 371 (c)(1),
(2), (4) Date: Mar. 9, 2009

(87) PCT Pub. No.: WO2008/032021
PCT Pub. Date: Mar. 20, 2008

(65) Prior Publication Data
US 2010/0002281 A1 Jan. 7, 2010

(30) Foreign Application Priority Data
Sep. 11, 2006 (GB) .................................. 0618021.0

(51) Int. Cl.
*G02F 1/01* (2006.01)
(52) U.S. Cl. ............................ 359/240; 398/188; 372/12
(58) Field of Classification Search ................ 359/240
See application file for complete search history.

(56) References Cited

U.S. PATENT DOCUMENTS

| | | | |
|---|---|---|---|
| 5,010,346 A | 4/1991 | Hamilton et al. | |
| 5,315,426 A * | 5/1994 | Aoki ............................... | 398/147 |
| 5,619,364 A * | 4/1997 | Burns et al. .................... | 359/246 |
| 5,838,475 A | 11/1998 | Takeyari et al. | |
| 5,930,024 A | 7/1999 | Atlas | |
| 6,134,038 A | 10/2000 | DeSurvire et al. | |
| 6,501,591 B1 * | 12/2002 | Kumar et al. .................. | 359/330 |
| 6,735,229 B1 | 5/2004 | Delfyett et al. | |

(Continued)

FOREIGN PATENT DOCUMENTS

| | | |
|---|---|---|
| EP | 0 503 579 A2 | 3/1992 |
| EP | 0504834 * | 3/1992 |

(Continued)

OTHER PUBLICATIONS

NG, et al.; "Characterization of the Jitter in a Mode-Locked Er-Fiber Laser and Its Application in Photonic Sampling for Analog-to-Digital Conversion at 10 Gsample/s;" *Journal of Lightwave Technology*; Aug. 2004; pp. 1953-1961; vol. 22, No. 8.

(Continued)

*Primary Examiner* — James Jones
(74) *Attorney, Agent, or Firm* — Oliff & Berridge, PLC (57) ABSTRACT

An optical clock comprises a laser oscillator and modulating means arranged to cooperate with the laser oscillator to produce a series a series of phase-modulated optical pulses. The optical clock further comprises an optical fiber arranged to provide compression of the optical pulses, and may also comprise a step-recovery diode arranged to pulse-pick pulses output from the fiber to produce a series of optical clock pulses, depending on the mode of operation of the modulating means. Phase-modulation is carried out a frequency which provides sufficient linewidth broadening to inhibit stimulated Brillouin scattering within the optical fiber. An optical clock of the invention provides a robust and reliable alternative to clocks based on modelocked lasers, and may be assembled from inexpensive, commonly-available components. The repetition rate of a clock of the invention may easily be adjusted by electronic means. Unlike many modelocked lasers, a clock of the invention does not require precise optical alignment.

21 Claims, 8 Drawing Sheets

U.S. PATENT DOCUMENTS

| | | | |
|---|---|---|---|
| 2004/0240037 A1* | 12/2004 | Harter | 359/333 |
| 2005/0036525 A1 | 2/2005 | Liu | |
| 2005/0265407 A1 | 12/2005 | Braun et al. | |
| 2006/0018668 A1 | 1/2006 | Xu | |
| 2011/0002029 A1* | 1/2011 | Mcdonald | 359/276 |

FOREIGN PATENT DOCUMENTS

| | | |
|---|---|---|
| EP | 0 504 834 A2 | 9/1992 |
| EP | 0 595 536 A1 | 5/1994 |
| WO | WO 01/03254 A2 | 1/2001 |
| WO | WO 2008/032021 A2 | 3/2008 |

OTHER PUBLICATIONS

International Search Report issued in related International Application No. PCT/GB2009/000622 dated Jun. 12, 2009.

Written Opinion of the International Searching Authority issued in related International Application No. PCT/GB2009/000622 dated Jun. 12, 2009.

Great Britain Search Report issued in Great Britain Application No. 0804564.3 dated Aug. 8, 2008.

U.S. Appl. No. 12/918,885 in the name of McDonald, filed Aug. 23, 2010.

International Search Report issued Mar. 3, 2008 in copending International Application No. PCT/GB2007/003372.

Great Britain Search Report issued Nov. 16, 2006 in copending British Application No. GB0618021.0.

Written Opinion issued in Application No. PCT/GB2007/003372 on Feb. 22, 2008.

Nov. 19, 2012 Office Action in U.S. Appl. No. 12/918,885.

* cited by examiner

OPTICAL CLOCK

BACKGROUND OF THE INVENTION

Summary

The invention relates to optical clocks.

Optical clocks which produce ultra-short optical pulses with low timing jitter are of interest in applications such a high bit-rate optical communication and photonic analogue-to-digital conversion (ADC). In the case of photonic ADC, ultra-short optical clock pulses are required so that an analogue signal can be sampled at a series of discrete times, avoiding integration over a range of signal values each time the analogue signal is sampled. Low timing jitter is desirable because errors in sampling time result in inaccurate conversion of a rapidly changing analogue signal.

Optical clocks having the above characteristics typically comprise modelocked lasers, for example a diode-laser modelocked in an external cavity. Such a device requires significant human intervention in order to set the device up and keep it running in a desired operational state. Such devices are therefore highly unsuited to practical applications outside the laboratory. Clocks based on modelocked fibre-lasers (see for example W. Ng et al, Journal of Lightwave Technology, 22, pp 1953-1961, August 2004) provide some degree of physical and operational robustness, however such a device requires a feedback arrangement to compensate for drift in repetition rate resulting from path length changes caused by temperature fluctuations in the surrounding environment. Such clocks are therefore physically complex. Furthermore, modelocked lasers comprise very specialised components, making clocks based on them unsuitable for mass-production. Another problem associated with clocks based on modelocked lasers (including modelocked fibre-lasers) is that adjustment of the repetition rate of the optical clock pulses is complicated as this involves careful adjustment of the laser cavity length.

A first aspect of the invention provides an optical clock comprising a laser source, an amplitude-modulator arranged to cooperate with the laser source to produce a series of optical pulses, and optical fibre arranged to compress the optical pulses, wherein the linewidth of the laser source is sufficient to inhibit stimulated Brillouin scattering (SBS) of the optical pulses within the optical fibre.

An optical clock of the invention is simple in terms of construction, is robust and may be assembled from readily-available components. Such a clock may operate indefinitely without human intervention. Furthermore, an optical clock of the invention provides for simple (electronic) adjustment of the repetition rate of the optical clock pulses. Pulse compression occurs by a mechanism which includes self phase-modulation (SPM). Stimulated Brillouin scattering (SBS), which typically occurs within optical fibres at peak-powers also associated with SPM, and which can reduce optical power output and stability from the optical fibre, is inhibited as a result of the linewidth of the laser source and the optical pulses. Unlike optical clocks based on modelocked lasers, precise alignment of the components of a clock of the invention is not required. Optical pulses output from the optical fibre have low timing-jitter and may be as short as 10-15 ps as a result of compression by SPM, or SPM and group velocity dispersion. Optical pulses output from the optical fibre may be used directly as optical clock pulses, or they may be manipulated in some way (e.g. pulse-picked) to produce a series of optical clock pulses.

The laser source may comprise a broadband laser oscillator having a suitable linewidth. Alternatively it may comprise a narrow linewidth laser oscillator and modulating means arranged to cooperate with the laser oscillator to produce phase-modulated radiation and provide said radiation to the amplitude-modulator. The depth and frequency of the phase-modulation needs to be chosen to produce spectral broadening which is sufficient to inhibit SBS within the optical fibre.

The modulating means may comprise a phase-modulator arranged to phase-modulate the output of the laser oscillator, or alternatively, if the laser oscillator is a semiconductor laser oscillator, such as a DFB laser for example, the modulating means may comprise means arranged to modulate (dither) the injection-current of the semiconductor laser oscillator. A DFB laser has a very narrow linewidth so that in this case the linewidth of the laser source is controlled almost entirely by the modulation of its injection current.

In embodiments in which the laser source comprises a laser oscillator and modulating means arranged to cooperate with the laser oscillator to produce phase-modulated radiation, timing-jitter in the optical clock pulses may be reduced by arranging the modulating means to provide phase-modulation with a minimum modulation-depth consistent with inhibiting SBS within the optical fibre.

In order to reduce frequency-noise in the repetition frequency $f_{clock}$ of optical clock pulses output from the clock in the range from 10 Hz to $f_{clock}/2$, and hence make the output optical clock pulses better suited to sampling applications (e.g. photonic ADC), preferably the modulating means is arranged to provide phase-modulation at a frequency which is at least half the repetition frequency of the optical clock pulses. In some embodiments, the modulating means is arranged to carry out phase-modulation at a frequency less than half the repetition frequency of the series of phase-modulated optical pulses input to the optical fibre, and means are provided to pulse-pick optical pulses output from the optical fibre to produce optical clock pulses having a repetition frequency less than or equal to twice the frequency of phase-modulation. SBS within the optical fibre is inhibited provided phase-modulation is carried out at a frequency which is not equal to the repetition rate of the series of optical pulses introduced into the optical fibre, or a harmonic of this frequency, and provided a sufficient modulation depth is used.

The optical fibre may comprise standard telecommunications fibre, or dispersion decreasing fibre, or alternating lengths of standard telecommunications fibre and dispersion-shifted fibre.

To reduce the output power required of the laser source, an optical amplifier (e.g. an erbium-doped fibre-amplifier (EDFA)) may be used to amplify the series of optical pulses prior to compression by the optical fibre. The amount of amplified spontaneous emission entering the optical fibre from the fibre may be reduced by using a circulator at the end of the optical fibre into which the series of phase-modulated optical pulses is introduced, the circulator being coupled to a Bragg grating having a suitable grating-pitch.

A second aspect of the invention provides a method of generating a series of optical clock pulses, the method comprising the steps of:
 (i) generating output from a laser source;
 (ii) amplitude-modulating the output to produce a series of optical pulses; and
 (iii) passing the series of optical pulses through optical fibre to compress the optical pulses,
the linewidth of the laser source being sufficient to inhibit stimulated Brillouin scattering (SBS) of the optical pulses within the optical fibre.

BRIEF DESCRIPTION OF THE DRAWINGS

Embodiments of the invention are described below by way of example only, and with reference to the accompanying drawings in which.

DETAILED DESCRIPTION OF EMBODIMENTS

Figure 1:
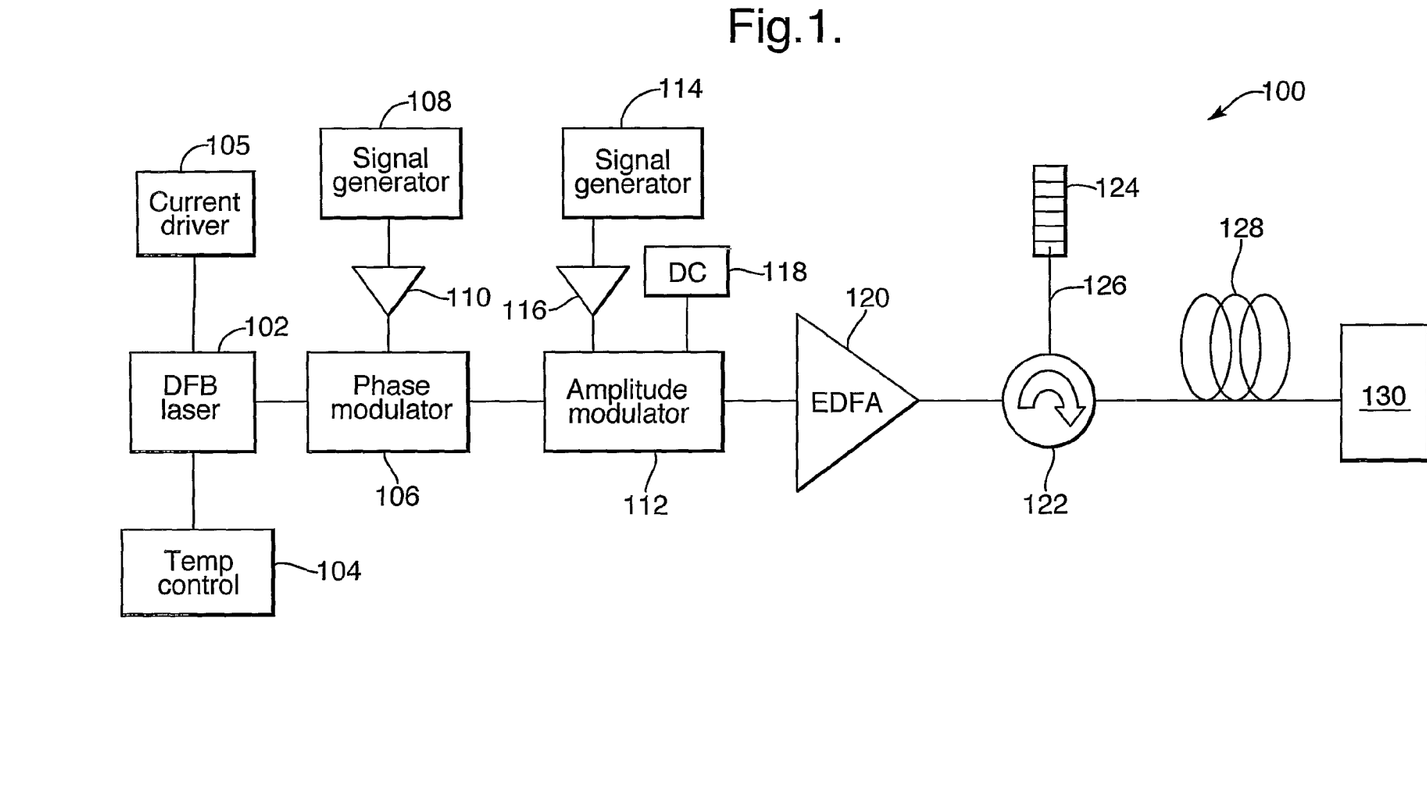
FIG. 1 shows a first example optical clock of the invention.

In FIG. 1, an optical clock 100 of the invention comprises a DFB laser oscillator 102 which is temperature-stabilised by a temperature-controller 104 to stabilise the output wavelength of the DFB laser 102. Output from the DFB laser 102 passes to a phase-modulator 106 and then to a push/pull-type amplitude-modulator 112. Modulators 106, 112 are standard devices, based on gallium arsenide for example, and are driven by signal generators 108, 114 the output signals of which are amplified by amplifiers 110, 116 before being applied to the modulators 106, 112. Signal generator 114 is an HP® model 83711A. A DC supply 118 provides a DC bias to the amplitude-modulator 112. Optical output from the amplitude-modulator 112 is in the form of a series of optical pulses which are amplified by an erbium-doped fibre-amplifier (EDFA) 120 and input to an optical fibre 128 via a circulator 122 which is coupled to a Bragg grating 124 by a short length of optical fibre 126. The optical fibre 128 is a 25.2 km length of SMF-28 fibre. The circulator 122 and Bragg grating 124 act to reduce amplified spontaneous emission within the optical fibre 128 originating from the EDFA 120. Individual optical pulses are compressed on passing through the optical fibre 128 by solution-effect compression, which includes self phase-modulation (SPM). The EDFA 120 is adjusted so that individual optical pulses have sufficient peak power to allow SPM. A step-recovery diode 130 is arranged to pulse-pick optical pulses emerging from the optical fibre 128 to produce a series of optical clock pulses. (An amplitude-modulator may be used as an alternative pulse-picking device.) The optical clock 100 may be operated as follows to generate optical clock pulses with a repetition rate of 3 GHz (for example). The signal generator 108 is adjusted so that output from the DFB laser oscillator is phase-modulated at a frequency of 1.5 GHz and with a maximum modulation depth of $3\pi/5$ radians. It is desirable that the modulation depth is no greater than is required to reduce SBS within the optical fibre 128 because a larger modulation depth tends to increase timing-jitter in the optical clock pulses output from the clock 100. The signal generator 114 is set at frequency of 3 GHz so that optical output from the phase-modulator 106 is amplitude-modulated by the modulator 112 to produce a series of phase-modulated optical pulses having a repetition rate of 6 GHz (see discussion below relating to FIG. 5A). The DC supply 118 is adjusted to keep the modulator 112 biased at null in order to avoid positive and negative chirping of successive optical pulses output from the amplitude-modulator 112, which would result in non-identical successive optical pulses. Phase-modulated optical pulses output from the amplitude-modulator are amplified by EDFA 120 and compressed by the optical fibre 128 by group velocity dispersion and SPM to produce pulses 10-15 ps in duration. The optical pulses output from the optical fibre 128 are pulsed-picked by the step-recovery diode 130 to remove every second pulse and produce a series of optical clock pulses having a repetition rate of 3 GHz. In this example, phase-modulation is carried out at exactly half the repetition frequency of the optical clock pulses output from the clock 100 in order to achieve low frequency-noise in the clock pulses, whilst SBS within the optical fibre 128 is avoided because phase-modulation is carried out at a frequency which is less than the repetition frequency of the series of optical pulses entering the fibre 128.

Figure 2:
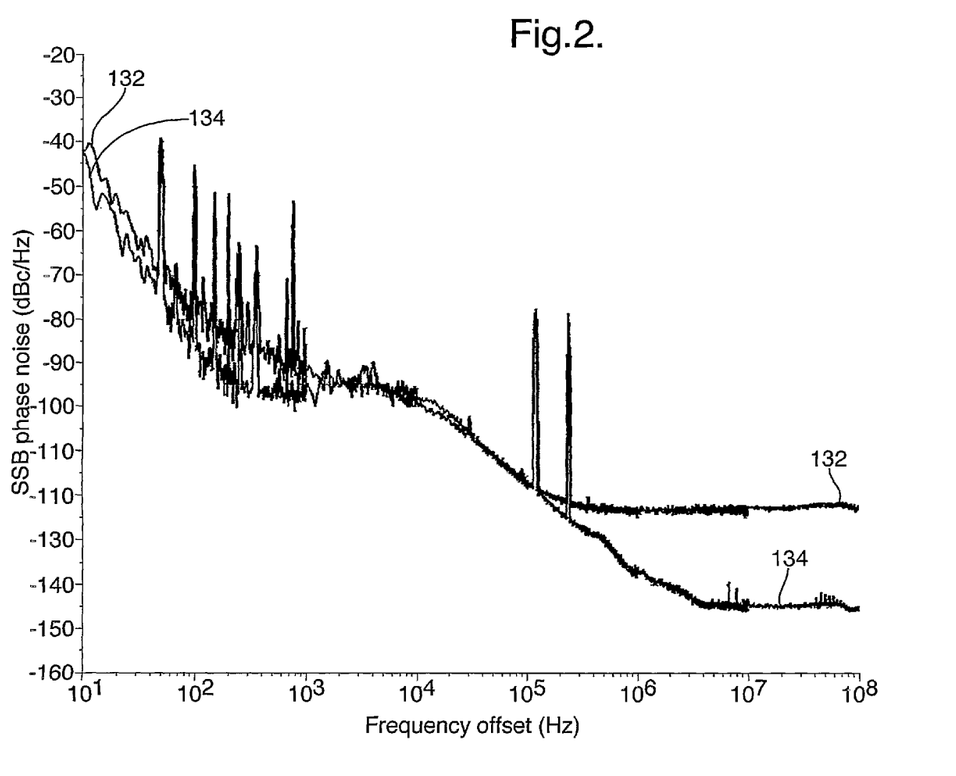
FIG. 2 shows single-sideband (SSB) phase-noise measurements for optical clock pulses output by the optical clock of FIG. 1 and for a signal generator comprised therein.

FIG. 2 shows single sideband (SSB) phase-noise measurements for 6 GHz optical clock pulses (132) generated by the optical clock 100 as described above, and also for the signal generator 114. At frequencies less than a few hundred kHz, the SSB phase-noise in the optical clock pulses is dominated by phase-noise in the output of the signal generator 114. A more stable signal generator improves the SSB phase-noise in this frequency range. Above a few hundred kHz, SSB phase-noise in the optical clock pulses falls to a level less than −120 dBc/Hz. Ignoring frequency-noise spikes at 117.5 and 236 kHz in the output of the signal generator 114, and also frequency-noise caused by the mains electricity supply, the timing-jitter in the range 10 Hz-1.5 GHz of the optical clock pulses output by the clock 100 is 2.687 ps (1.5 GHz being the maximum frequency that can be sampled by 3 GHz clock pulses for analogue-to-digital conversion). The period of the optical clock pulses is 333 ps.

Figure 3:
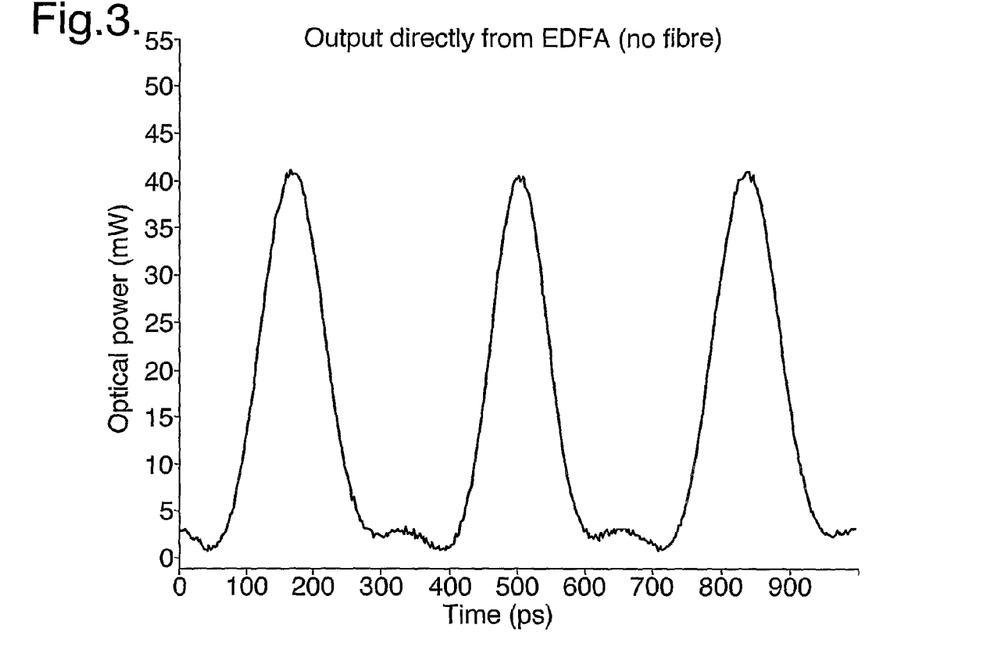
FIGS. 3 and 4 illustrate optical pulse compression within the optical clock of FIG. 1.
Figure 4:
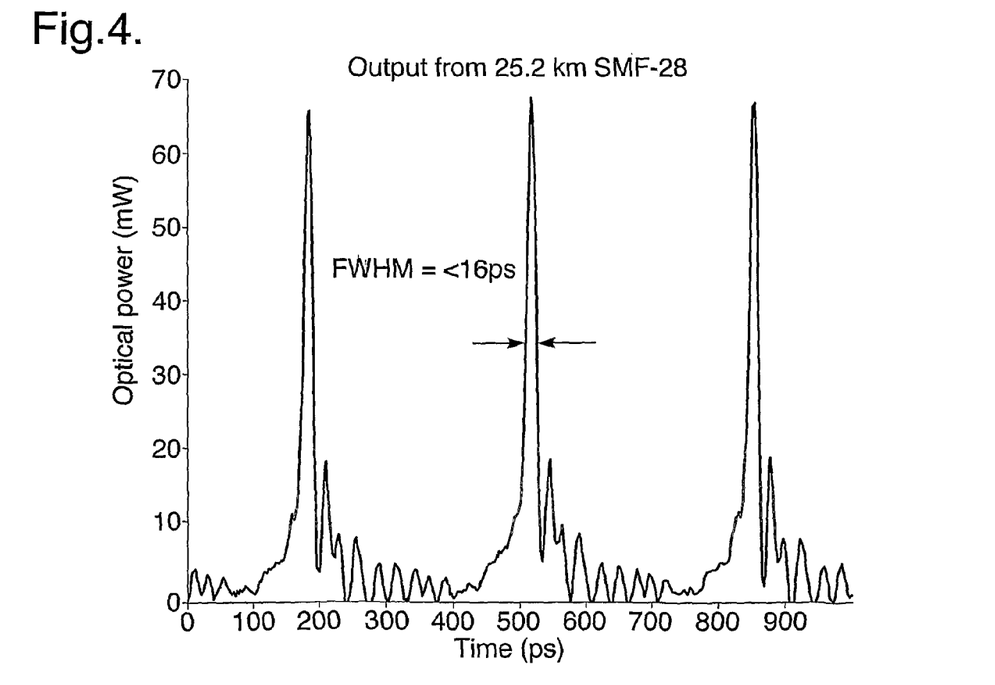

FIG. 3 shows three of a series of phase-modulated optical pulses output from the EDFA 120 when the signal generator 114 is operated at 1.5 GHz so that the series has a repetition rate of 3 GHz. The full-width at half-maximum (FWHM) duration of these pulses is approximately 140 ps. FIG. 4 shows the pulses after passage through the optical fibre 128. As a result of compression by group velocity dispersion and SPM (i.e. solution-effect compression) within the optical fibre 128, the FWHM of the pulses is reduced to less than 16 ps.

Figure 5A:
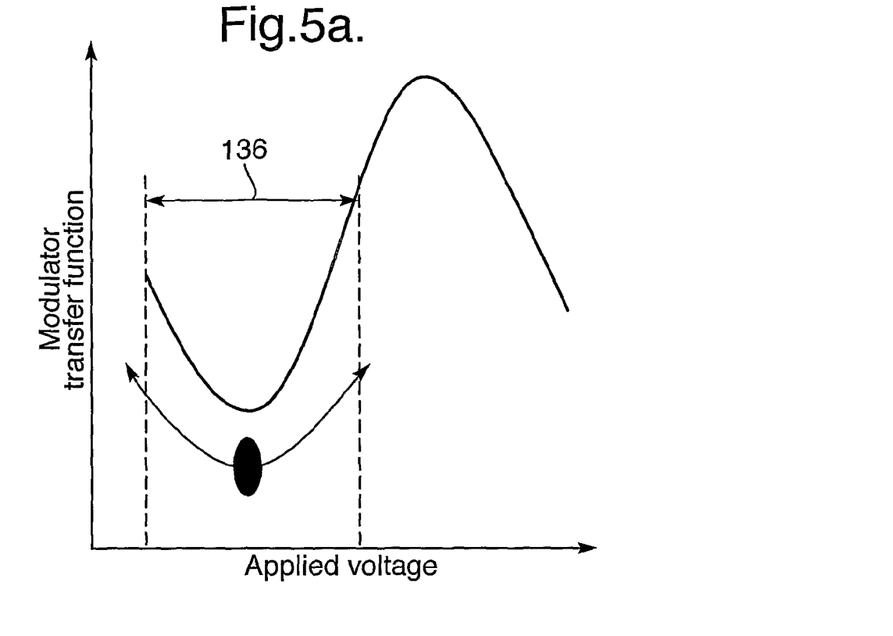
FIGS. 5A & 5B show a portions of the modulator transfer function of an amplitude modulator comprised in the FIG. 1 clock.

FIG. 5A shows the modulation transfer function of the amplitude modulator 112 as a function of voltage applied by the DC supply 118. In the clock 100 of FIG. 1 the bias voltage applied by the DC voltage supply 118 is adjusted so that a portion 136 of the function is utilised.

Figure 6:
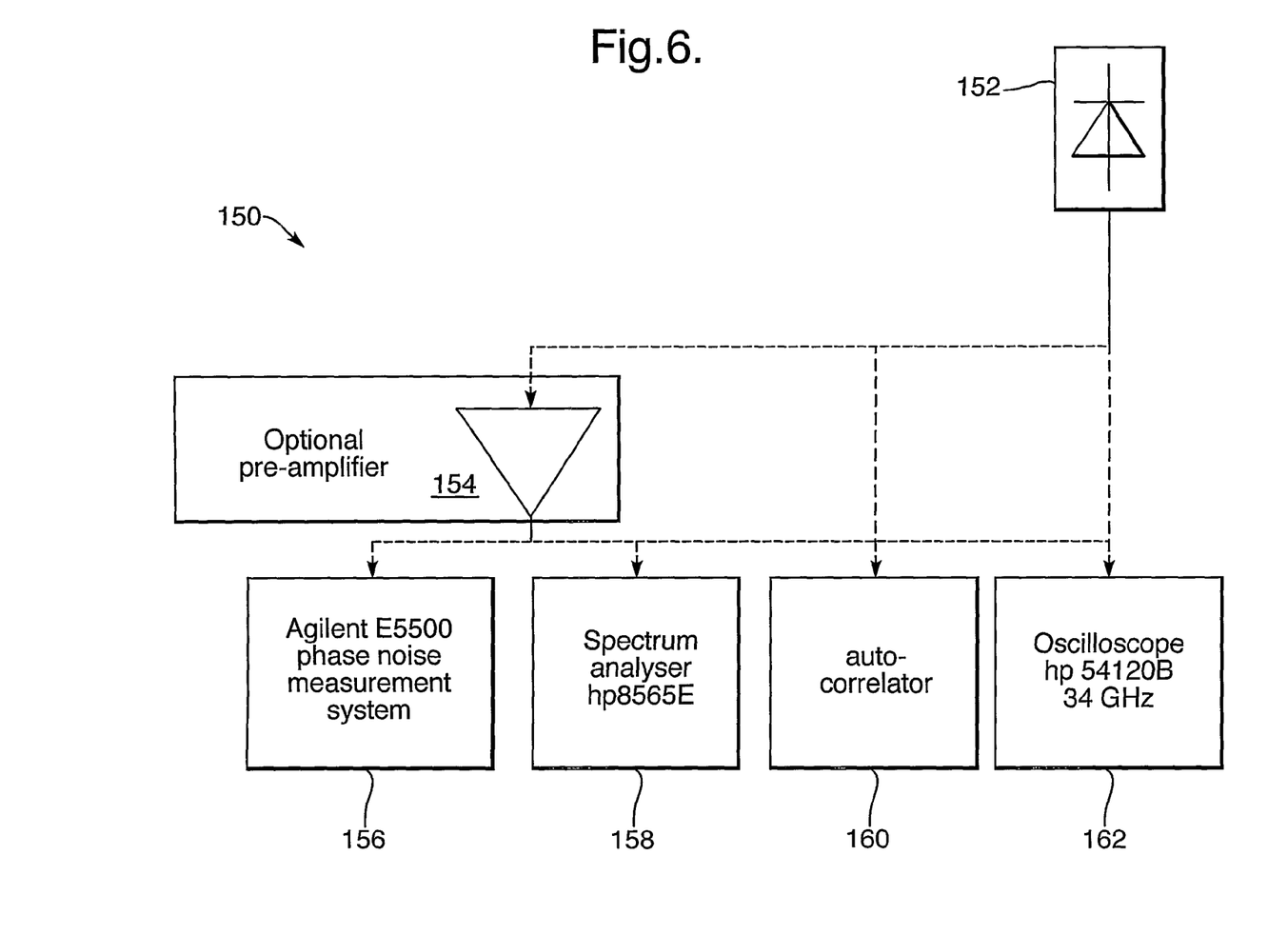
FIG. 6 shows apparatus suitable for analysing optical clock pulses output by optical clocks of the invention.

FIG. 6 shows apparatus 150 for analysing optical clock pulses output by the clock 100. The apparatus comprises a photodiode 152 at which optical clock pulses are detected, an auto-correlator 160 for measuring pulse durations, an oscilloscope 162, a phase-noise measurement system 156 (e.g. Agilent® model E5500) and a spectrum analyser 158 (e.g. HP® model 8565E). A pre-amplifier 154 may be used with the phase-noise measurement system 156 and the spectrum analyser 158.

Figure 5B:
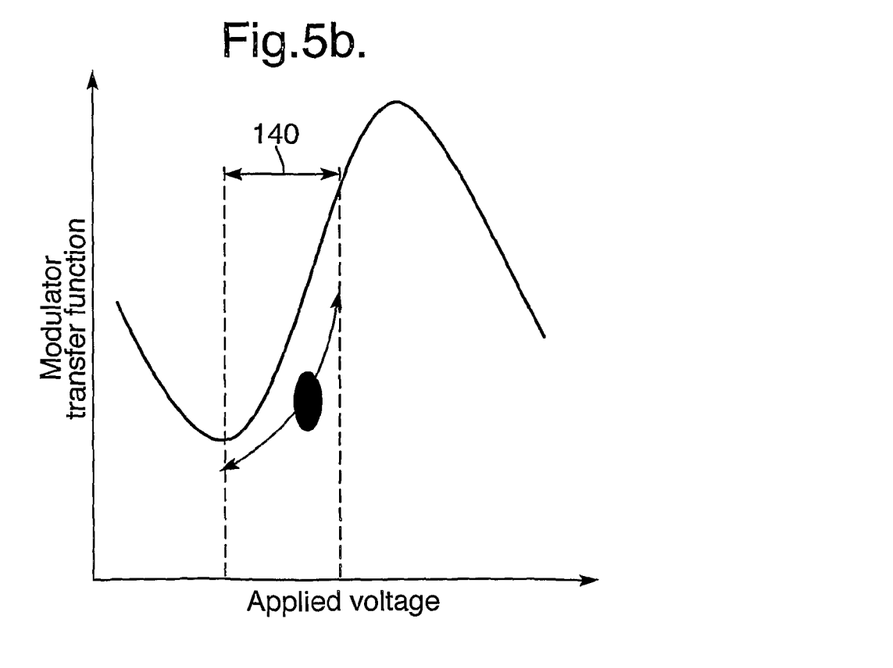

Referring to FIG. 5B, the DC supply 118 may alternatively be adjusted to bias the amplitude modulator 112 so that a portion 140 of the transfer function is used: in this case the repetition frequency of pulses output by the modulator 112 is equal to the frequency of the signal applied by the signal generator 114 via the amplifier 110 and the step-recovery diode 130 may be dispensed with. The repetition rate of pulses input to the fibre 128, and that of the final clock pulses, are then both equal to 3 GHz.

Figure 7:
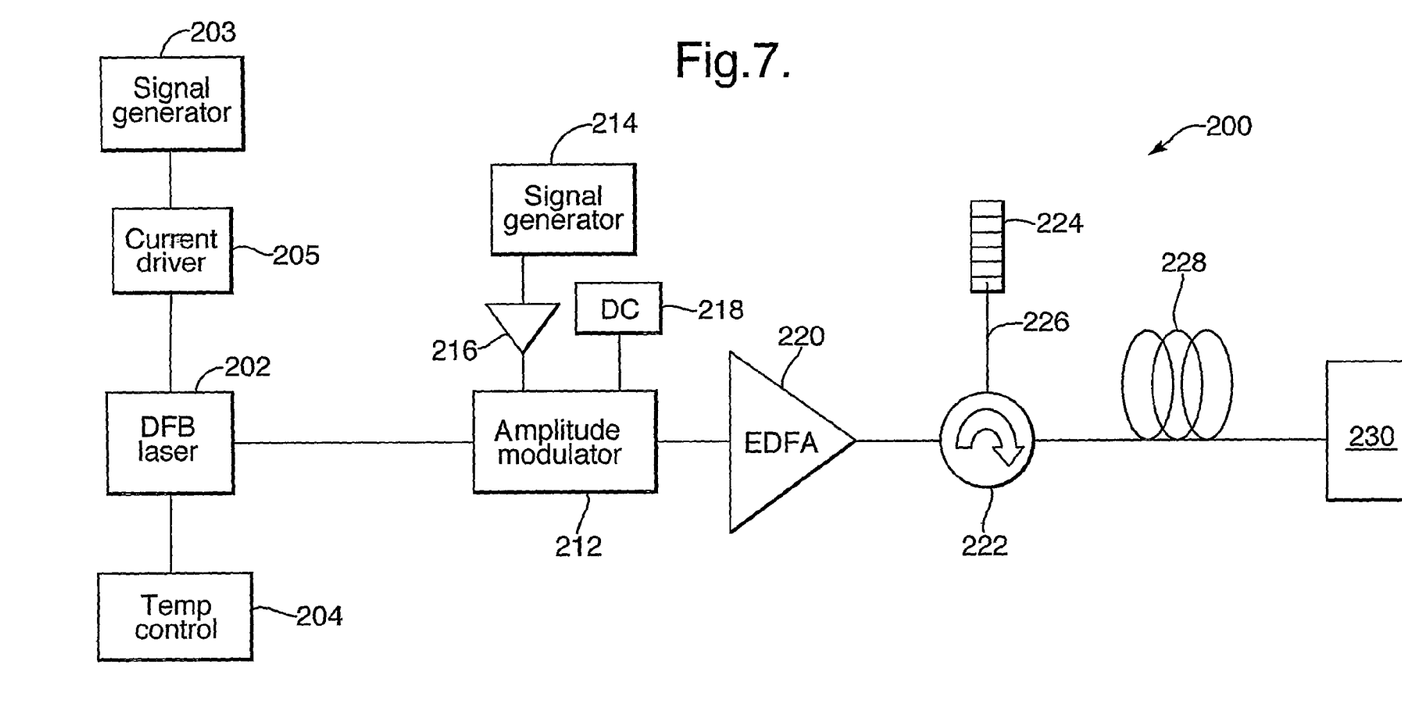
FIG. 7 shows a second example optical clock of the invention.

A second optical clock of the invention is indicated generally by 200 in FIG. 7. Parts of the clock 200 corresponding to parts of the clock 100 of FIG. 1 are labelled with reference numerals differing by a value of 100 from reference numerals labelling the corresponding parts in FIG. 1. The clock 200 operates in a similar manner to the clock 100 of FIG. 1 except that phase-modulation of individual optical pulses output from amplitude-modulator 212 is achieved by modulating, or dithering, the injector current of DFB laser 202 using a signal generator 203. The modulation depth of the current dithering should be very small compared to the injection current level in order to avoid variation in the output power of the DFB laser 202. A modulation depth of 0.2%-0.5% of the injection-current level provides sufficient phase-modulation to avoid SBS, provided the dithering is carried out at a suitable frequency.

Figure 8:
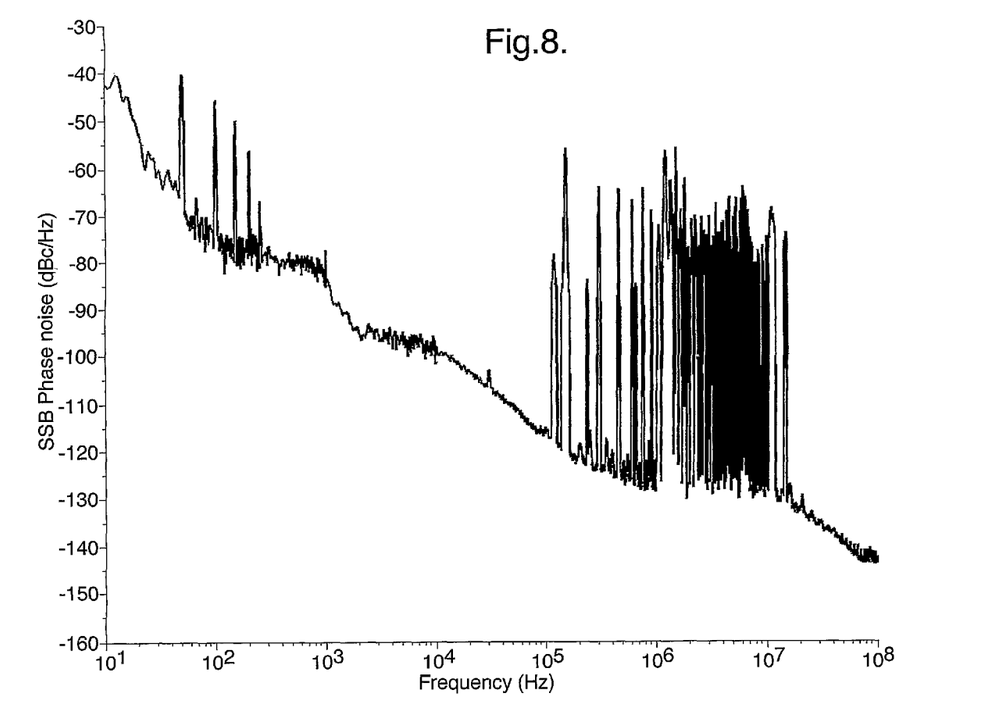
FIG. 8 shows SSB phase-noise measurements for optical clock pulses output by the FIG. 6 clock.

FIG. 8 shows SSB phase-noise measurements for the clock 200 of FIG. 7. Significant noise occurs at the dithering frequency of the injection current and harmonics of this frequency. For ADC applications, it is therefore desirable to dither the injection-current at a frequency which is at least half the repetition frequency of the optical clock pulses output by the clock 200.

Figure 9:
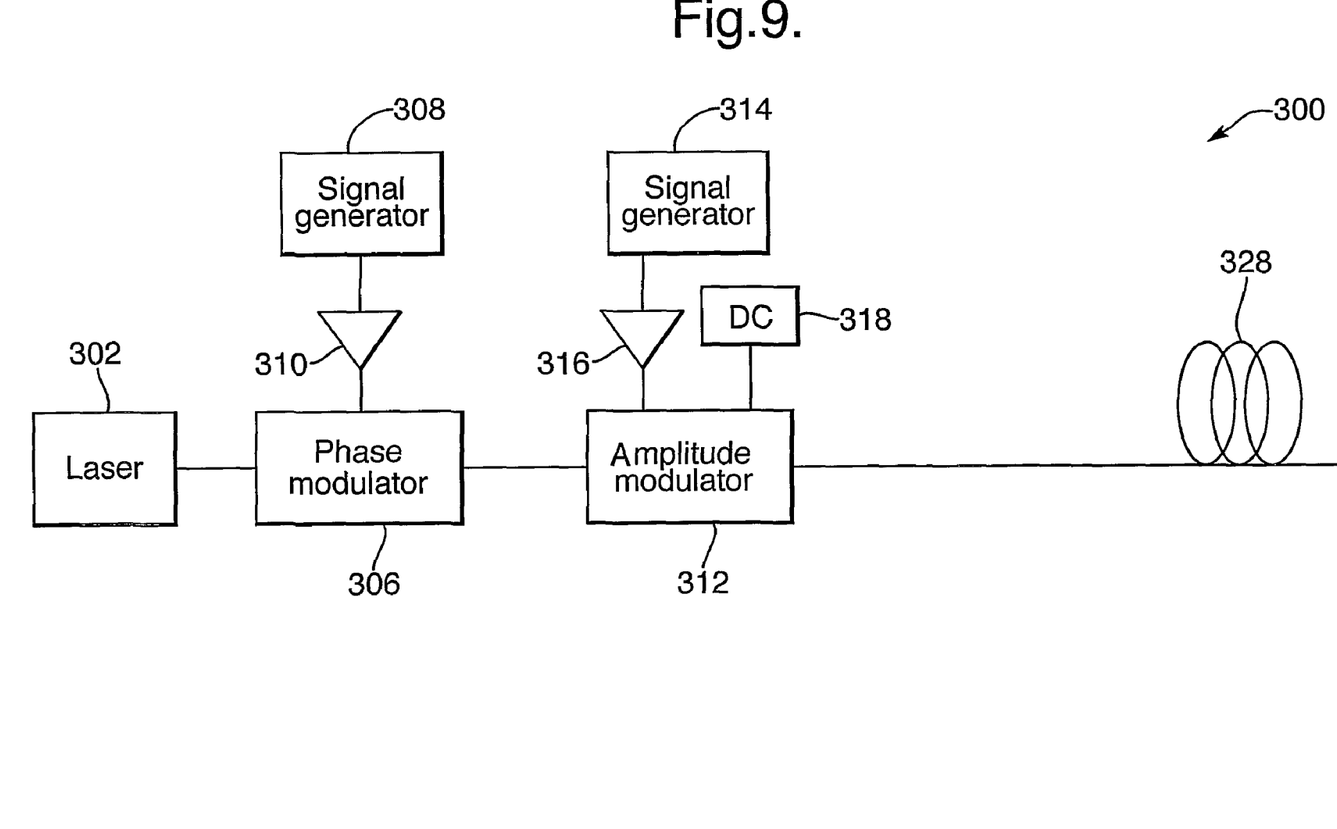
FIG. 9 shows a third example optical clock of the invention.

A third optical clock of the invention is indicated generally by 300 in FIG. 9. Parts of the clock 300 corresponding to parts of the clock 100 of FIG. 1 are labelled with reference numerals differing by a value of 200 from reference numerals labelling the corresponding parts in FIG. 1. The clock 300 comprises a cw Er:glass laser 302, the optical output of which is phase- and amplitude-modulated by modulators 306, 312 to produce a series of phase-modulated optical pulses which is directly input to an optical fibre 328 to achieve solution-effect pulse compression by SPM and group velocity dispersion. A series of optical clock pulses is output from the end of optical fibre 128 remote from the amplitude-modulator 312.

Phase-modulation is carried out at a frequency of 3 GHz and with a modulation-depth less than or equal to 3π/5 radians. Signal generator 314 is operated at 2 GHz so that the series of phase-modulated optical pulses output from the amplitude-modulator 312 has a repetition frequency of 4 GHz. Optical clock pulses are output from the fibre 328 at a repetition frequency of 4 GHz (i.e. the DC supply 318 is adjusted so that the amplitude modulator 312 operates in a region of its transfer function equivalent to the region 136 in FIG. 5A). Low frequency-noise in the clock pulses is achieved because the frequency of phase-modulation is greater than half the repetition frequency of the output optical clock pulses. SBS within the fibre 328 is inhibited by carrying out phase-modulation at a frequency which is not equal to the repetition rate of pulses input to the fibre 328, or a harmonic of this frequency.

The invention claimed is:

1. An optical clock comprising a laser source, an amplitude-modulator arranged to cooperate with the laser source to produce a series of optical pulses, and an optical fibre arranged to compress the optical pulses, wherein the linewidth of the laser source is sufficient to inhibit stimulated Brillouin scattering (SBS) of the optical pulses within the optical fibre.

2. An optical clock according to claim 1 wherein the laser source comprises a laser oscillator and modulating means arranged to cooperate with the laser oscillator to produce phase-modulated radiation and provide said radiation to the amplitude-modulator.

3. An optical clock according to claim 2 wherein the modulating means comprises a phase-modulator arranged to phase-modulate output from the laser oscillator.

4. An optical clock according to claim 2 wherein the laser oscillator is a semiconductor laser oscillator and the modulating means comprises means arranged to modulate the injection-current of the semiconductor laser oscillator.

5. An optical clock according to claim 4 wherein the semiconductor laser oscillator is a DFB laser.

6. An optical clock according to claim 2 wherein the modulating means is arranged to provide phase-modulation with a minimum modulation-depth consistent with reducing SBS in the optical fibre.

7. An optical clock according to claim 2 wherein the modulating means is arranged to provide phase-modulation at a frequency which is at least half the repetition frequency of optical clock pulses output by the clock.

8. An optical clock according to claim 7 wherein the modulating means is arranged to provide phase-modulation at a frequency less than half the repetition frequency of the series of optical pulses and wherein the clock further comprises means arranged to pulse-pick optical pulses output from the optical fibre to produce the optical clock pulses.

9. An optical clock according to claim 1 wherein the optical fibre comprises standard telecommunications fibre.

10. An optical clock according to claim 1 wherein the optical fibre comprises alternating lengths of standard telecommunications fibre and dispersion-shifted fibre.

11. An optical clock according to claim 1 wherein the optical fibre comprises dispersion decreasing fibre.

12. An optical clock according to claim 1 further comprising an optical amplifier arranged to amplify the series of optical pulses prior to input thereof to an end of the optical fibre.

13. An optical clock according to claim 1 further comprising a circulator positioned at an end of the optical fibre and a Bragg grating optically coupled to the circulator, and wherein the circulator and the Bragg grating are arranged to reduce amplified spontaneous emission within the optical fibre.

14. A method of generating a series of optical clock pulses, the method comprising the steps of:
(i) generating output from a laser source;
(ii) amplitude-modulating the output to produce a series of optical pulses; and
(iii) passing the series of optical pulses through optical fibre to compress the optical pulses,
the linewidth of the laser source being sufficient to inhibit stimulated Brillouin scattering (SBS) of the optical pulses within the optical fibre.

15. The method of claim 14 wherein step (i) comprises the step of producing phase-modulation in the output of a laser oscillator.

16. The method of claim 15 wherein step (i) comprises the step of phase-modulating the output of a laser oscillator.

17. The method of claim 15 wherein step (i) comprises the step of modulating the injection-current of a semiconductor laser oscillator.

18. The method of claim 15 wherein the phase-modulation is produced with a minimum modulation-depth consistent with inhibiting SBS in the optical fibre.

19. The method of claim 15 wherein the phase-modulation is provided with a modulation frequency which is at least half the repetition frequency of the series of optical clock pulses.

20. The method of claim 19 wherein the phase-modulation has a modulation frequency less than half the repetition frequency of the series of optical pulses and wherein the method further comprises the step of pulse-picking optical pulses output from the optical fibre to produce the optical clock pulses.

21. The method of claim 14 further comprising the step of amplifying the series of optical pulses prior to input thereof to an end of the optical fibre.

* * * * *